United States Patent [19]

Fujiwara et al.

[11] Patent Number: 4,734,857
[45] Date of Patent: Mar. 29, 1988

[54] FIXED AMOUNT OR FIXED RATE DISCOUNT/PREMIUM CALCULATION IN AN ELECTRONIC CASH REGISTER

[75] Inventors: Toshiaki Fujiwara, Nara; Ryuji Miyazaki, Kashiwara, both of Japan

[73] Assignee: Sharp Kabushiki Kaisha, Osaka, Japan

[21] Appl. No.: 412,380

[22] Filed: Aug. 27, 1982

[30] Foreign Application Priority Data

Sep. 8, 1981 [JP] Japan .................. 56-133916

[51] Int. Cl.$^4$ .............................................. G07G 1/12
[52] U.S. Cl. .................................................. 364/405
[58] Field of Search ................... 364/405, 404; 235/2, 235/7 R

[56] References Cited

U.S. PATENT DOCUMENTS 4,084,238 4/1978 Masuo .................................. 364/405
4,159,533 6/1979 Sakurai ........................... 364/405 X

FOREIGN PATENT DOCUMENTS 0006439 1/1977 Japan .................................... 364/405
0157057 12/1979 Japan .................................... 364/405

OTHER PUBLICATIONS

Klay, H. et al., "The Hasler Electronic Cash Register Type ECR-A", *Hasler Review*, vol. 12, No. 1, Spring 1979, 19–27.
Kraus, J. R. et al., "Point of Sale System with Tip Control Function", *IBM Technical Disclosure Bulletin*, vol. 17, No. 12, May 1975, 3674.

*Primary Examiner*—Jerry Smith
*Assistant Examiner*—Clark A. Jablon
*Attorney, Agent, or Firm*—Birch, Stewart, Kolasch & Birch

[57] ABSTRACT

A single function key is provided for selectively conducting a fixed amount discount (premium) calculation or a fixed rate (%) discount (premium) calculation in an electronic cash register. A preset system is associated with the discount (premium) calculation system so that the fixed amount discount (premium) calculation mode or the fixed rate discount (premium) calculation mode is preset before initiating the normal registration operation.

2 Claims, 3 Drawing Figures

FIXED AMOUNT OR FIXED RATE DISCOUNT/PREMIUM CALCULATION IN AN ELECTRONIC CASH REGISTER

BACKGROUND AND SUMMARY OF THE INVENTION

The present invention relates to an electronic cash register and, more particularly, to a control system for calculating a discount amount or a premium amount in an electronic cash register.

There are two types of calculation which may be made in connection with the discount amount and the premium amount. One type determines a fixed discount amount (premium amount). Another type determines a fixed discount rate (%) (premium rate (%)) in order to obtain the discount amount (premium amount). In the conventional electronic cash register, at least two function keys are required to selectively perform the amount calculation and the rate calculation. Furthermore, the operation is complicated because the operator must always check whether the discount amount (premium amount) should be calculated through the use of the fixed discount amount (premium amount) or the fixed discount rate (premium rate).

Accordingly, an object of the present invention is to provide a novel control system in an electronic cash register for calculating a discount amount or a premium amount.

Another object of the present invention is to provide a preset system in an electronic cash register for selectively presetting a rate (%) calculation or an amount calculation mode in order to obtain the discount amount or the premium amount.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a single discount (premium) key is provided for conducting the discount amount (premium amount) calculation. In a preset mode, the electronic cash register is preset to perform either the fixed amount calculation or the fixed rate calculation. In the normal registration operation, when the single discount (premium) key is actuated, the discount amount (premium amount) calculation is conducted in accordance with the preset state.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
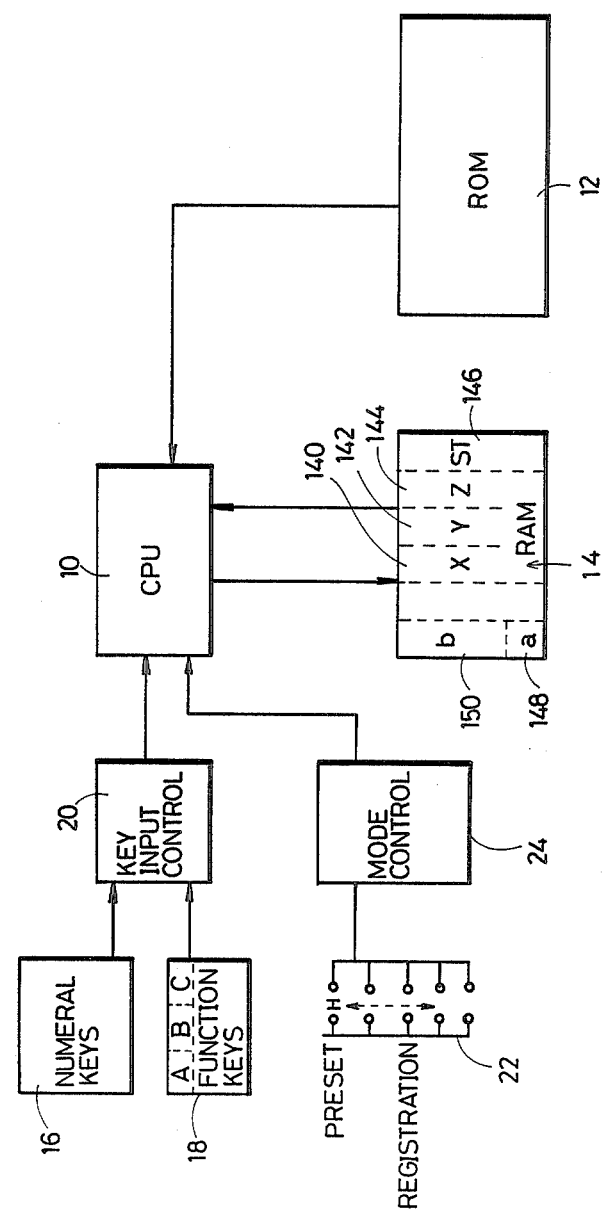
FIG. 1 is a block diagram of an embodiment of an electronic cash register according to the present invention.

An electronic cash register of the present invention includes a central processor unit 10 for controlling the registration operation in accordance with a program stored in a read only memory 12. The transaction data processed by the central processor unit 10 is memorized in a random access memory 14. A keyboard panel includes numeral keys 16 and function keys 18 in order to introduce the transaction data and the operation instruction into the central processor unit 10 via a key input control circuit 20.

The random access memory 14 includes memory areas 140, 142 and 144 for memorizing the introduced numeral data and for conducting the calculation operation, a memory area 146 for storing a subtotal amount processed by the central processor unit 10, a flag memory area 148, and a memory area 150 for storing various data processed by the central processor unit 10. In a preferred form, the central processor unit 10 and the read only memory 12 are implemented by a single chip LSI $\mu$PD766G (NEC$\mu$COM-47) manufactured by Nippon Electric Co., Ltd. The random access memory 14 is $\mu$PD445 manufactured by Nippon Electric Co., Ltd. The key input control circuit 20 is $\mu$PD7501 manufactured by Nippon Electric Co., Ltd.

The electronic cash register of the present invention further includes a mode selection switch 22 for selectively placing the electronic cash register in a preset mode or a normal registration mode. A mode selection signal developed from the mode selection switch 22 is applied to the central processor unit 10 via a mode control circuit 24.

Figure 2:
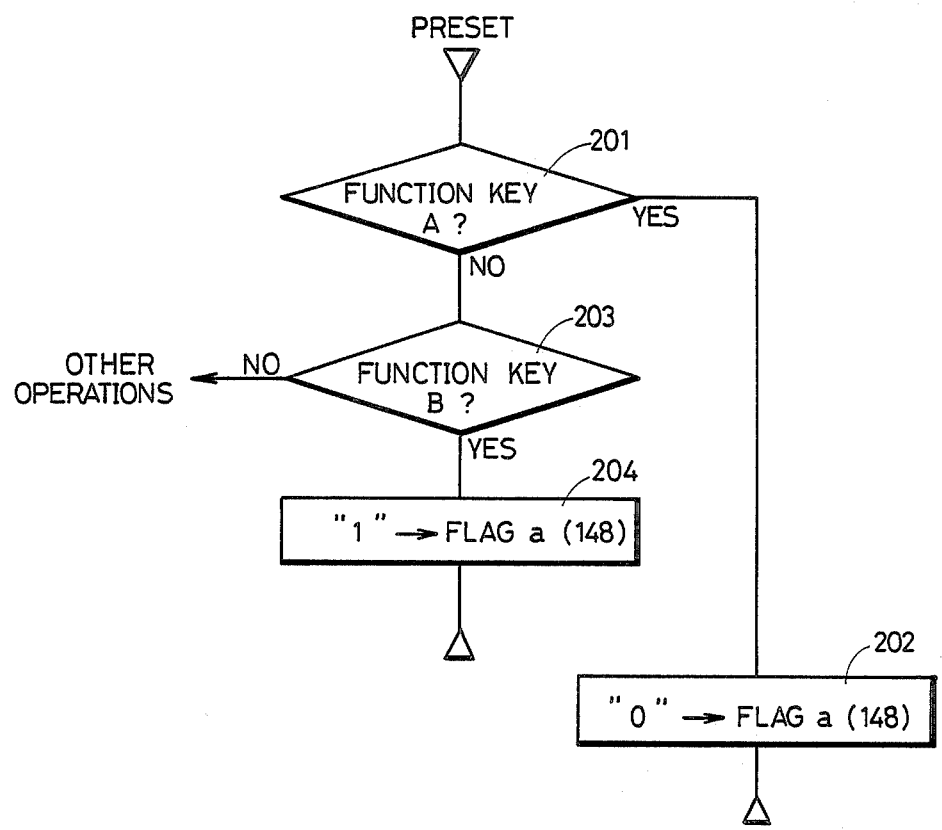
FIG. 2 is a flow chart for explaining an operational mode in a preset mode of the electronic cash register of FIG. 1.

When the electronic cash register is placed in the preset mode through the use of the mode selection switch 22, the operation is conducted in accordance with the program shown in a flow chart of FIG. 2. At a first step 201, it is detected whether a function key "A" included in the function keys 18 is actuated. When the actuation of the function key "A" is detected, the program is advanced to a step 202 at which the data "0" is introduced into and stored in the flag memory area 148 of the random access memory 14. When the actuation of the function key "A" is not detected, the program is advanced to the following step 203 at which it is detected whether a function key "B" included in the function keys 18 is actuated. When the actuation of the function key "B" is detected, the program is advanced to a step 204 at which the data "1" is introduced into and stored in the flag memory area 148 of the random access memory 14. When the actuation of the function key "B" is not detected, the program is advanced to other steps to perform other operations.

More specifically, the function key "A" is to preset the fixed amount discount (premium) calculation mode, wherein the data "0" is stored in the flag memory area 148. The function key "B" is to preset the fixed rate (%) discount (premium) calculation mode, wherein the data "1" is stored in the flag memory area 148.

Figure 3:
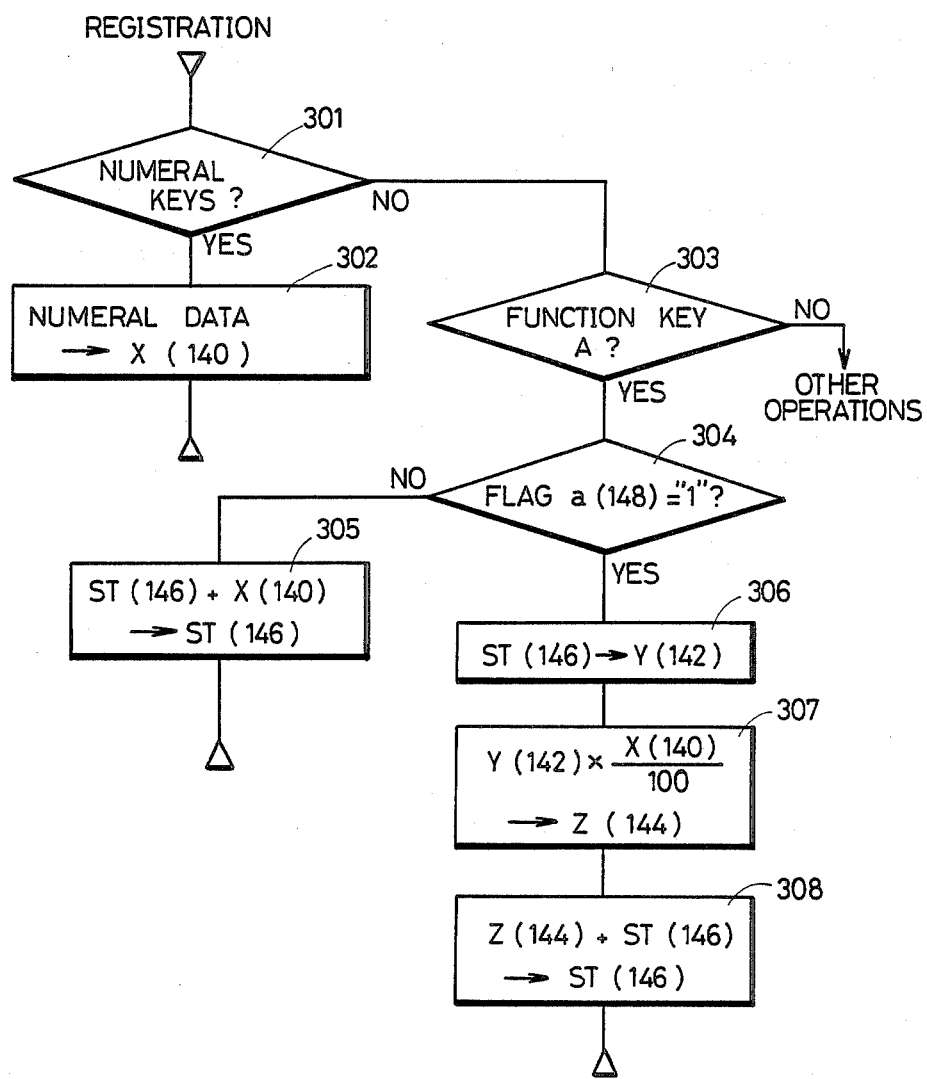
FIG. 3 is a flow chart for explaining an operational mode in a normal registration mode of the electronic cash register of FIG. 1.

Thereafter, when the electronic cash register is placed in the normal registration mode through the use of the mode selection switch 22, the operation is conducted in accordance with the program shown in the flow chart of FIG. 3. Steps 301 and 302 function, in combination, to introduce the transaction numeral data into the memory area 140 of the random access memory 14. The thus introduced transaction data is accumulated in the memory area 146 for storing the subtotal amount. In this way, the normal registration operation is conducted.

If the function key "A" is actuated immediately after the introduction of the numeral data, the key input control circuit 20 develops the detection signal which is applied to the central processor unit 10 so that the program is advanced from a decision step 303 to the following step 304. The step 304 is to detect whether the flag memory area 148 (a) stores the data "0" or "1". When the flag memory area 148 (a) does not store the data "1", the program is advanced from the step 304 to a step 305 at which the numeral data previously introduced into the memory area 140 (X) is added to or subtracted from the subtotal amount accumulated in the memory area 146 (ST).

When the data "1" stored in the flag memory area 148 (a) is detected at the step 304, the program is advanced to a step 306 at which the subtotal amount accumulated in the memory area 146 (ST) is transferred to the memory area 142 (Y). Then, the subtotal amount stored in the memory area 142 (Y) is multiplied by the numeral data (discount rate (%)) previously introduced into the memory area 140 (X). The calculation result Y·X/100 is introduced into and stored in the memory area 144 (Z) (step 307). At the following step 308, the calculation result (Y·X/100) is added to or subtracted from the subtotal amount stored in the memory area 146 (ST). In this way, the discount (premium) calculation is conducted through the use of the discount (premium) rate introduced into the electronic cash register.

The function key "A" is used to preset the fixed amount discount (premium) calculation. The function key "B" is used to preset the fixed rate discount (premium) calculation. In the registration operation mode, the single function key "A" is used without regard to the preset calculation of the fixed amount mode or the fixed rate mode.

If desired, the fixed rate (%) is memorized in the memory area 150 (b) in the preset mode. More specifically, when a desired rate is introduced into the electronic cash register in the preset mode and, then, the function key "B" is actuated, the desired rate data is introduced into and stored in the memory area 150 (b) of the random access memory 14. The thus memorized discount (premium) rate is applied to the central processor unit 10 for calculation purposes when the function key "A" is actuated in the normal registration operation mode.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
   setting means for selectively placing said cash register in either a presetting mode of operation or a normal regristration mode of operation;
   a first function key operational in said presetting mode for setting said cash register in a fixed amount discount mode and a second function key opertional in said presetting mode for setting said cash register in a fixed rate discount mode;
   memory means responsive to said first and second function keys for storing a signal representing either said fixed amount discount mode or said fixed rate discount mode;
   discount instruction input means operational in said normal registration mode of operation for instructing said cash register to perform a discount calculation; and
   control means responsive to said discount instruction input means and responsive to said signal in said memory means in said normal registration mode of operation for conducting either a fixed amount discount calculation or a fixed rate discount calculation.

2. An electronic cash register as in claim 1, wherein said discount instruction input means comprises one of said function keys.

* * * * *